(No Model.)
A. G. SARGENT.
THERMOSTAT.
No. 416,503. Patented Dec. 3, 1889.
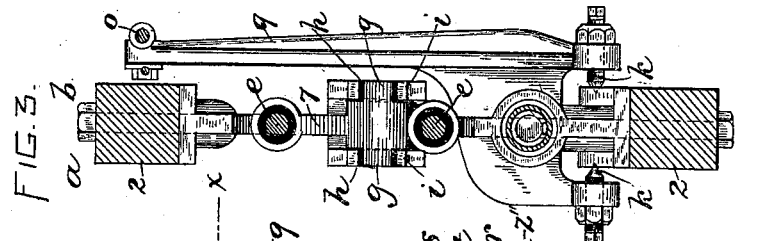
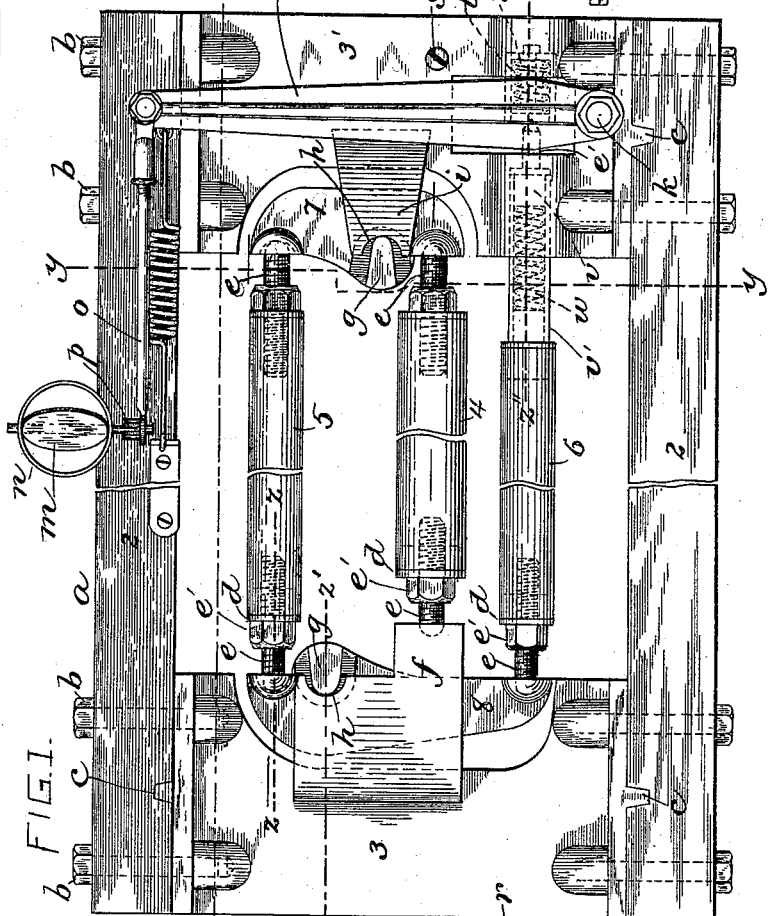
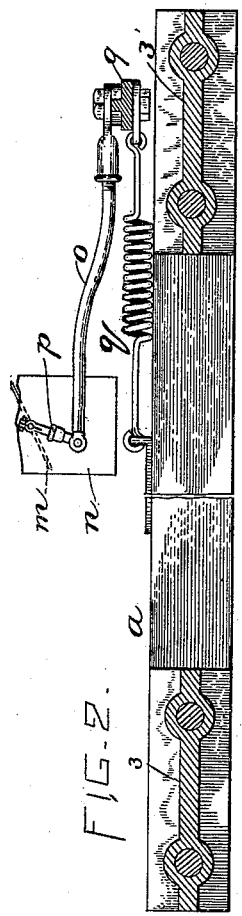
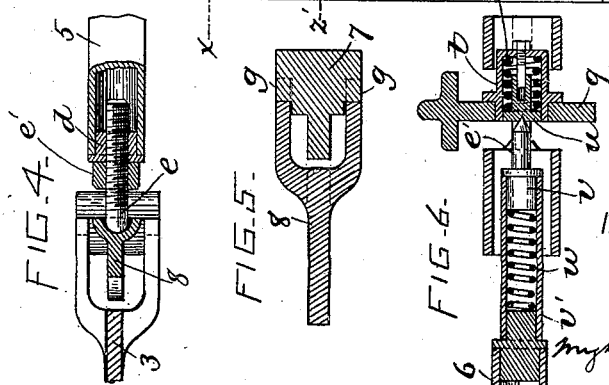
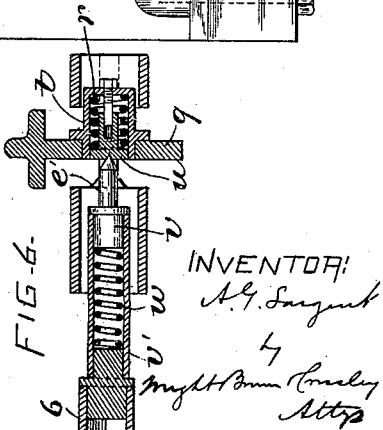
WITNESSES:
K. E. Brouer
A. D. Hanson
INVENTOR:
A. G. Sargent
by
Wright Brown Crosley
Attys

UNITED STATES PATENT OFFICE.

ARTHUR G. SARGENT, OF LACONIA, NEW HAMPSHIRE, ASSIGNOR OF ONE-HALF TO THE LACONIA CAR COMPANY, OF SAME PLACE.

THERMOSTAT.

SPECIFICATION forming part of Letters Patent No. 416,503, dated December 3, 1889.

Application filed May 29, 1889. Serial No. 312,538. (No model.)

*To all whom it may concern:*

Be it known that I, ARUHUR G. SARGENT, of Laconia, in the county of Belknap and State of New Hampshire, have invented certain new and useful Improvements in Thermostats, of which the following is a specification.

This invention has for its object to provide a thermostat of simple construction adapted to open and close a ventilator or operate any other heat-regulating device—as a damper controlling a heating apparatus—which shall operate on the principle of the expansion and contraction of a series of metallic rods or members and the multiplication of the movement of each member in such manner that the heat-regulating device shall be effectively moved.

The invention consists in a thermostat composed of a series of metallic rods or expansion members, the first of which has a fixed bearing at one end, a series of levers divided into longer and shorter arms, one of which supports one end of the first expansion member, while the others support the ends of the other members, said levers being arranged to multiply the expanding and contracting movements of each member, and suitable connections through which the aggregate movement caused by the expansion and contraction of each member and the multiplication thereof is imparted to a ventilator, damper, or other heat-regulating device.

The invention also consists in certain minor improvements incidental to the foregoing, all of which I will now proceed to describe and claim.

Of the accompanying drawings, forming a part of this specification, Figure 1 represents a top plan view of my improved thermostat. Fig. 2 represents a longitudinal section of the same on line $x\,x$, Fig. 1. Fig. 3 represents a transverse section on line $y\,y$, Fig. 1. Fig. 4 represents a section on line $z\,z$, Fig. 1. Fig. 5 represents a section on line $z'\,z'$, Fig. 1. Fig. 6 represents a section on line $z''\,z''$, Fig. 1.

The same letters of reference indicate the same parts in all of the figures.

In carrying out my invention I make a rectangular frame $a$, composed of longitudinal bars 2 2, of wood or other material which is not expansible by heat to any material extent, and transverse bars 3 3', which, for the sake of strength and durability, are made of metal. The bars 3 3' are firmly secured to the side bars 2 2 by bolts $b$ and by tenons $c$, formed on the bars 3 3' and let into mortises in the side bars 2, said tenons aiding the bolts in maintaining a rigid connection between the bars 2 and 3.

4 5 6 represent the expansion members, which are of brass or other metal having a suitable coefficient of expansion, and are preferably composed of lengths of tubing having plugs $d$ in their ends to receive the adjustable screw-threaded terminals $e\,e$, with which each member is provided.

The first member 4 is supported at one end by a projection $f$ on the cross-bar 3, one of the terminals $e$ of said member entering a socket formed in said projection. The opposite terminal of the member 4 bears against the shorter arm of a lever 7, which has trunnions $g\,g$ resting in sockets $h$ formed in ears $i\,i$ on the cross-bar 3'.

The second member 5 bears at one end against the longer arm of the lever 7, and at the other end against the shorter arm of a lever 8, having trunnions $g\,g$, which rest in sockets $h$ in the projection $f$ on the cross-bar 3.

The third member 6 bears at one end against the longer arm of the lever 8, and at its opposite end against a lever 9, which is connected at one end to the cross-bar 3' by pivots $k\,k$, and is connected at its free end by suitable intermediate devices with a valve or damper $m$ in a ventilating pipe or flue $n$, or with any other suitable heat-regulating device, the connecting devices here shown being a rod $o$, jointed to the lever 9, and a crank-arm $p$, attached to the valve $m$ and jointed to the rod $o$.

It will be seen that the expansion of the first member 4 is multiplied by the lever 7, so that the second member 5 is moved by the multiplied expansion of the first member and in addition thereto by its own expansion. The aggregate movement thus imparted to the second member is multiplied by the lever 8 and imparted to the third member 6, which imparts to the damper-operating lever 9 the total movement caused by the expansion of the members 4 5, the multiplying-levers 7 8, and its own expansion. The bearing of the third member 6 on the lever 9 is at a point near the pivoted end of said lever, so that the movement is further multiplied by the lever 9.

The valve $m$ or other heat-regulating device connected with the lever 9 is operated by the movement thus produced to decrease the temperature of the apartment in which the thermostat is located, and in like manner said device is operated to increase the temperature by the contraction of the members 4 5 6. To keep the lever 9 constantly under the control of the member, I provide a spring $q$, which is arranged to hold said lever in yielding contact with the terminal of said member, so that when the members 4 5 6 are contracting the lever 9 will follow the receding terminal of the member 6 until the valve or damper is closed.

To prevent movement of the lever 9 after the heat-regulating device $m$ has reached its maximum heat-reducing position—or, in other words, when the valve is fully opened—I provide a rigid stop $s$, which arrests the lever 9 when said position is reached. Further expansion of the members 4 5 6 beyond said point is permitted by a spring $r$, inclosed in a boss $t$ on the lever 9, and a piston $u$, Fig. 6, in said boss supported by the spring $r$, the terminal of the member 6 bearing against said piston, as shown in Fig. 6. The spring $r$ is sufficiently strong to keep the piston $u$ from yielding as long as the lever 9 is free to move; but when said lever is arrested by the stop $s$ the spring yields to the further movement of the member 6, so that no damage can result from the stoppage of the lever 9.

The terminal $e'$ of the member 6 is attached or formed on a piston $v$, which is movable in a tubular extension $v'$ on said member 6, and is held with a yielding pressure against the lever 9 (or the piston $u$ therein) by a spring $w$ in said extension. The spring $w$ is lighter than the spring $r$, so that the effect is the same as if the terminal $e'$ were in contact with the body of the lever 9. The spring $w$, reacting against the lever 9, presses the member 6 against the longer arm of lever 8, the shorter arm of lever 8 against the member 5, the member 5 against the longer arm of lever 7, the shorter arm of lever 7 against the member 4, and the member 4 against the fixed socket or bearing $f$, so that said parts are always in operative relation to each other and lost motion is prevented. It will be observed that the spring $w$ compensates for any contraction of the members 4 5 6 which may occur after the valve or heat-controlling device has reached the limit of its heat-increasing position, further contraction of said members being taken up by said spring $w$, so that close contact will be maintained between ends of the members and the bearings therefor.

The screw-threaded terminals $e$ may be adjusted by rotating them in the plugs $d$, which are internally screw-threaded. The members 4 5 6 may thus be extended or contracted, and may be easily contracted to such an extent that they can be disengaged from the levers 7 8. The operations of taking apart and putting together the operative parts of the thermostat may therefore be conveniently and quickly performed. Jam-nuts $e'$ prevent the threaded terminals from rotating loosely.

The bearing portions of the trunnions $g$ of the levers 7 8 are preferably rounded, and the sockets $h$, in which they rest, are curved, but have a larger curvature than the bearing portions of the trunnions, so that the contact of the trunnions with the sockets is reduced to the narrow limits, and the trunnions are enabled to move on the sockets with the minimum of friction. The rounded form of the trunnions prevents wear of the sockets.

The described apparatus may be placed in any suitable part of an apartment the temperature of which is to be regulated, and connected with the damper or other operating device in any suitable way.

It will be observed that the metallic end pieces 3 3' contain the bearings of the levers 7 8 and other working parts and sustain all the wear to which the frame is subjected. They are arranged at right angles with the expansion-rods, so that their expansion and contraction do not affect the operation of the apparatus.

The employment of the wooden side pieces, which are parallel with the expansion members, makes the frame non-expansive lengthwise of said members, so that there is no interference with their action by expansion or contraction of the frame.

It is obvious that each expansion member may have but one adjustable terminal $e$ instead of two. The adjustability of the length of the expansion members enables the apparatus to be set or adjusted to commence to open and close the valve at any desired degree of temperature.

It will be observed that the terminals of the expansion members bear on the inner sides of the levers with which they co-operate, and in expanding press outwardly upon said levers, the direction of the pressure being such as to cause a compressive strain on said members. This arrangement enables me to make the expansion members of thin tubing of large diameter, so that they will be readily acted on by variations of temperature, it being only necessary to provide the ends of the tubes with plugs having suitable terminals or end bearings adapted to enter sockets in the levers.

I claim—

1. In a thermostat, the combination of a supporting-frame, a series of multiplying-levers fulcrumed on the frame and provided with sockets, a fixed socketed bearing $f$ on the frame, a series of expansion members, each composed of a tube and terminals attached to the ends of the tube to enter the sockets in the said levers and bearing, and an operating-lever engaged with the last member of the series, the tubular construction of said members enabling them to respond quickly to variations of temperature, as set forth.

2. In a thermostat, the combination of the supporting-frame, the series of expansion members, the multiplying-levers communicating and multiplying motion through the series of members, the operating-lever arranged to be moved by the last member of the series, a rigid stop limiting the movement of said lever, and a spring-supported bearing on said lever which yields to permit the continued movement of the expansion members after the stoppage of said lever, as set forth.

3. In a thermostat, the combination of the supporting-frame, the series of expansion members, the multiplying-levers communicating and multiplying motion through the series of members, the operating-lever arranged to be moved by the last member of the series, and a spring interposed between said member and the operating-lever, whereby pressure is communicated from said lever through the series of members and multiplying-levers, as set forth.

4. In a thermostat, an expansion member having one or more adjustable terminals, whereby the said member may be extended or contracted, as set forth.

5. In a thermostat, the combination of the multiplying-levers having the rounded trunnions, and the fixed bearings having concave sockets for said trunnions, but of greater curvature than the latter, as set forth.

In testimony whereof I have signed my name to this specification, in the presence of two subscribing witnesses, this 24th day of May, A. D. 1889.

ARTHUR G. SARGENT.

Witnesses:
C. F. BROWN,
A. D. HARRISON.